United States Patent
Bernitz

[15] 3,669,484
[45] June 13, 1972

[54] BUMPER FOR MOTOR VEHICLES

[72] Inventor: Bernhard Bernitz, Hannover, Germany

[73] Assignee: Continental Gummi-Werke Aktiengesellschaft, Hannover, Germany

[22] Filed: Dec. 17, 1969

[21] Appl. No.: 885,679

[30] Foreign Application Priority Data

Oct. 19, 1968 Germany............P 18 15 655.3

[52] U.S. Cl. .................................293/71 R, 29/446, 293/99
[51] Int. Cl. .................................................B60r 19/08
[58] Field of Search..........................293/54 D, 71, 71 P, 99; 29/446, 452; 297/422; 248/345.1; 114/219; 267/139, 140

[56] References Cited

UNITED STATES PATENTS

| 1,336,527 | 4/1920 | Lewis et al. | 293/54 D X |
| 2,858,159 | 10/1958 | Borah | 293/71 R |
| 3,226,145 | 12/1965 | Goldberg | 293/65 |
| 3,250,560 | 5/1966 | Tullock | 293/1 |
| 1,852,240 | 4/1932 | Hill | 114/219 |
| 1,901,377 | 3/1933 | Roe | 248/345.1 |

Primary Examiner—Arthur L. La Point
Assistant Examiner—Robert Saifer
Attorney—Walter Becker

[57] ABSTRACT

A bumper structure with attached strip of yieldable resilient material such as rubber, for motor vehicles in which the strip is stretched in longitudinal direction while engaging the bumper at least over portions thereof and being connected to said bumper by screws, hooks, or the like, extending through holes in said bumper, the total of the length of said screws, hooks, or the like, being at least 1.5 times longer than the difference between the spacing of said screws, hooks, or the like, when the strip is detached from the bumper and the spacing between the holes in said bumper.

9 Claims, 7 Drawing Figures

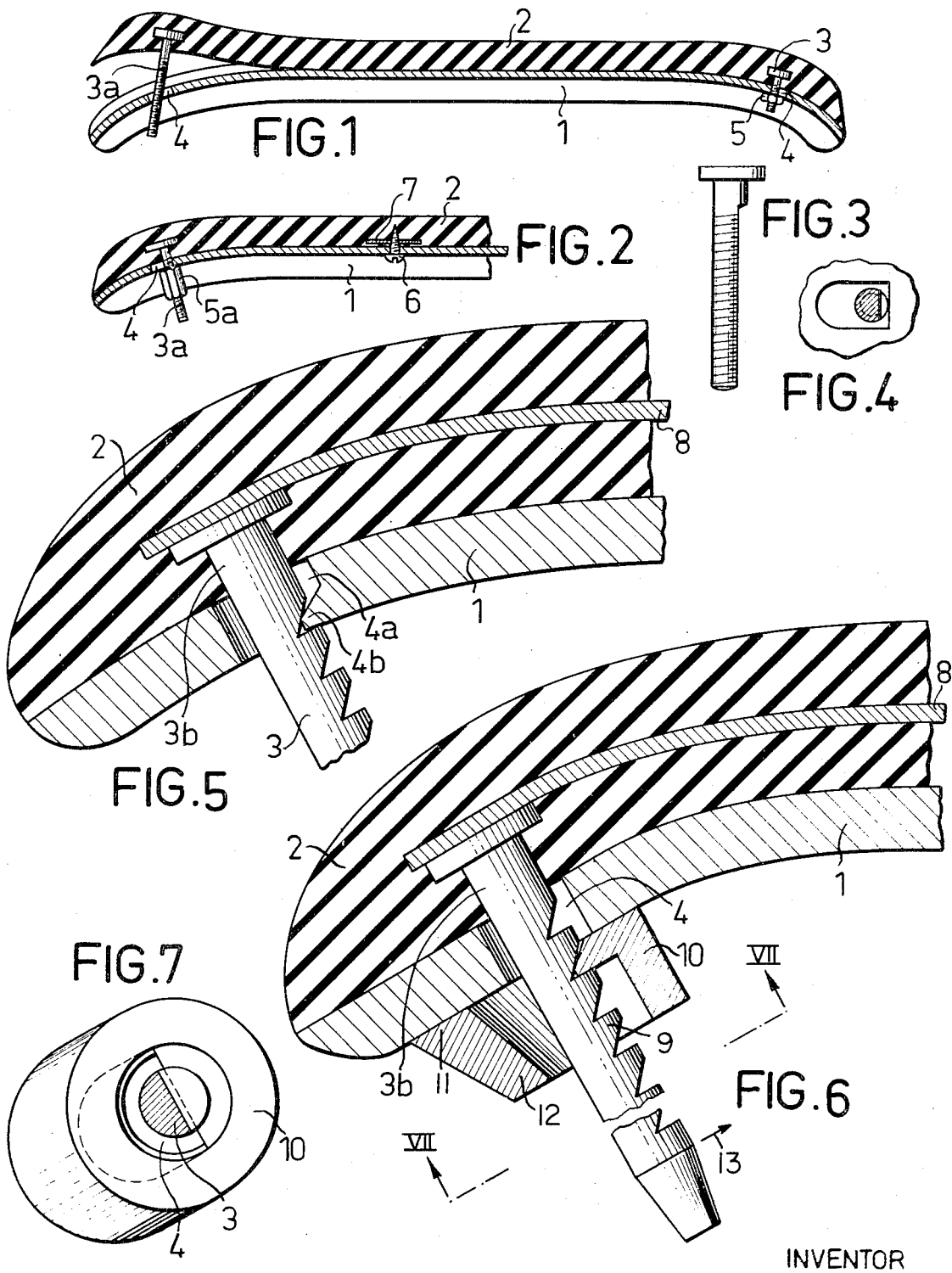

BUMPER FOR MOTOR VEHICLES

The present invention relates to a bumper structure with attached rubber strip for motor vehicles, said rubber strip being tensioned in its longitudinal direction and contacting said bumper over a portion of its length or over its entire length while being connected at least at its ends by means of screws, hook, or the like, to said bumper.

When connecting the rubber strip to a bumper of heretofore known construction, a special tool is required in order to bring about a longitudinal stretching of the rubber strip. Tools of this type are, in most instances, designed in the form of levers, or the rubber strip itself is at the ends thereof provided with threaded portions which are engaged by the respective tool and after the tensioning or stretching of the strip remain therein. Thus, for each strip, in addition to connecting means also special tensioning means are required.

It is an object of the present invention to design the connecting means for connecting the strips to the bumpers in such a way that no additional stretching or tensioning tools are required.

This object and other objects and advantages of the invention will appear more clearly from the following specification, in connection with the accompanying drawings, in which:

FIG. 1 illustrates a horizontal longitudinal section through a bumper with a rubber strip partially connected to the bumper.

FIG. 2 shows the left-hand portion of FIG. 1 with the rubber strip section fully connected to the bumper.

FIG. 3 illustrates a connecting means according to the invention.

FIG. 4 is a transverse section through the connecting means of FIG. 3.

FIG. 5 illustrates in a considerably larger scale than FIGS. 1—4 a portion of a rubber strip and bumper with a modified connecting means according to the invention.

FIG. 6 represents a modification over the arrangement of FIG. 5 with regard to the holding means for the connecting bolt.

FIG. 7 is a section along the line VII—VII of FIG. 6.

The bumper structure with attached rubber strip according to the invention is characterized primarily in that the connecting means provided at the end portions of the rubber strip without the length required for engagement with the nut have individually or together at least 1½ times the length of the difference between the spacing of the connecting means from each other and the spacing of the bores in the bumper which receive the connecting means, said connecting means being provided with a thread or with a saw-tooth-shaped contour for pulling the connecting means into said bores.

For connecting the strip to the bumper, the connecting means has one end thereof connected to the rubber strip, and the other end of the connecting means is introduced into the respective bore in the bumper so that just enough length of the connecting means extends to the bumper to permit the placing of a nut thereon. By the tightening of the nut, the rubber strip is in one working step tensioned and connected to the bumper, inasmuch as the screw when pulling in the rubber strip stretches the latter until the distance between the connecting means equals the distance between the bores in the bumper. For fastening the rubber strip, no special tensioning devices or tools are required so that the cost for the rubber strip including the assembly costs are considerably reduced. Furthermore, it is not necessary when exchanging a damaged rubber strip to drive to repair shops, inasmuch as the disassembly of the old rubber strip and the reassembly of the new rubber strip can be carried out by the driver without help and without special tools.

According to a further development of the present invention, the rubber strip has a reinforcement inserted therein to which one end of the connecting means is fastened. In view of the connection of the connecting means with the reinforcing insert, it will be appreciated that with a reduced stretchability of the rubber strip, a smaller distance between the spacing of the bores in the bumper and the spacing of the connecting means is to be selected so that the connecting means may be shorter.

According to a still further improvement of the basic principle according to the invention, the two connecting elements may consist of screws with flattened areas facing each other while the bores are formed by stamping with rectilinear boundary surfaces facing each other. Such an arrangement will avoid that when tightening the nuts, the thread of the nuts may be damaged, inasmuch as the surfaces of the screw and the bores which will slide on each other will be smooth or plane. The arrangement according to the invention also furnishes the possibility of disassembling and reassembling the rubber strip as often as desired in order to eliminate accummulation of dirt or the like.

In order to speed up the assembly operation, it is possible in conformity with the present invention to make the two connecting elements of flat bar steel or round steel with locking or engaging means of tooth-shaped contour which are so designed as to counter any possible accidental loosening movement. These last mentioned connecting elements may be simply pulled into the bores or driven thereinto by hammer blows while the saw-teeth catch the remaining portions of the bores and permit a stepwise insertion of the connecting means.

Referring now to the drawings in detail, FIG. 1 illustrates the bumper 1 to which the rubber strip 2 is to be connected. According to the showing in FIG. 1, the right-hand side of the rubber strip 2 has a connecting means 3 in the form of a screw with the head thereof vulcanized into the rubber strip while the shank of screw 3 extends through a bore 4 in the bumper, and the protruding shank portion has threaded thereon a nut 5. The connecting means 3a at the left-hand end portion of the rubber strip 2 has a greater length than screw 3 at the right-hand portion of rubber strip 2 so that the length of the shank of screw 3a can bridge or compensate for the difference between the spacing of the screws 3 and 3a on one hand and the bores 4 on the other hand. The length of the screw 3a should be at least 1.5 the said spacing difference, so that screw 3a, when being inclined at approximately 45° with regard to the central axis of the pertaining bore 4, can be inserted through the latter and can by hand be provided with a nut 5a. The precise length of the screw can be calculated as the product from the above mentioned spacing difference and the $\sqrt{2}$ plus the length of the shank necessary to be engaged by a nut. The fact that some portions of the rubber strip may not by 100 percent engage the bumper is disregarded. Experience has shown that a free screw length of 1.5 times the above mentioned spacing difference will suffice as minimum length.

By tightening the nut 5a (see FIG. 2), the rubber strip 2 is stretched in its longitudinal direction and is eventually firmly connected to the bumper. For purposes of stretching or tensioning the rubber strip 2, it is, of course, also possible to use both connecting means 3 in which instance both connecting means 3 together equal the above mentioned spacing difference, and the stretching of the rubber strip is effected from both ends. After the stretching operation and the connection at both ends of the rubber strip has been completed, the rubber strip 2 may, for instance, by self-cutting screws 6 engaging inserts 7 in the rubber strip, be additionally connected along further areas of the bumper. This connection is advisable only with bumpers which are not or hardly curved, whereas with fairly well curved bumpers the location or positioning of the rubber strip 2 will be sufficiently secured - without further connecting points - by screws 3, 3a.

In order during the stretching of the rubber strip 2 to prevent the thread of the connecting means 3 from being damaged which would interfere with the repeated assembly and reassembly of the rubber strip 2, it is suggested in conformity with FIGS. 3 and 4 to flatten the connecting means in the direction of the effective stretching force and to design the corresponding surface of the bore 4 in conformity with FIG. 4 straight so that during the tensioning or stretching operation the sliding of the screw on the bore surface can be effected without undue high surface pressure.

In order to realize high tensioning forces with short tensioning strokes, a reinforcing insert 8 may be embedded in the rubber strip 2. Such a reinforcing insert may consist, for instance, of a steel band to which the head of the connecting means 3 are directly connected, e.g. by welding or soldering.

In order to reduce the assembly time required for the tightening of the screw 5a, it is possible in conformity with FIG. 5 to employ as connecting means bolts 3b made of flat steel or round steel. The length of these bolts 3b is determined in the same manner as the length of the screws 3 above referred to. The saw-tooth 9 will, similar to jaws, hold onto the bore 4a when the connecting means are pulled into the latter. It will be noted that in this instance bore 4a has an inwardly protruding section 4b. It is also possible for purposes of stretching the rubber strip 2 to drive the connecting means 3a of FIG. 5 by hammer blows onto the rubber strip 2 by steps into the bore 4a. For purposes of securing this connection, and in particular for preventing an inclined position of the connecting means 3, an especially shaped cap 10 may be placed upon the connecting means, which cap by means of the extended foot portion 11 rest against the bumper from the inside thereof and by means of the edge 12 prevents the connecting means 3b from tilting. In this instance it is not necessary to provide bore 4 with a protrusion 4b as it is shown in FIG. 5 in connection with bore 4a. When it is desired to remove the cap 10, this can easily be carried out by tilting the connecting means 3 manually in the direction of the arrow 13.

The strip 2 which has been referred to above as a rubber strip need not necessarily be of rubber or rubber-like material, but may also consist of flexible thermoplastic material such as polyvinylchloride or the like. It is also possible instead to employ strips of porous or foamed material as long as they can exert a cushioning effect.

It is, of course, to be understood that the present invention is, by no means, limited to the particular constructions shown in the drawings but also comprises any modifications within the scope of the appended claims.

What I claim is:

1. A bumper structure for motor vehicles, which includes: a bumper having only two bores therethrough spaced from each other in the longitudinal direction of said bumper, strip means of yieldable resilient material shorter than but extending along said bumper and engaging the same at least over the major length thereof, connecting bolt means each having a head portion permanently connected to said strip means, said strip means being stretched longitudinally and said bolt means being aligned with and extending through said bores when said strip is mounted on the bumper, and means associated with said bolt means for securing said bolt means to said bumper, said bolt means when withdrawn from said bores being spaced from each other by a distance less than the spacing between said bores by a distance substantially equaling the extent to which said strip means must stretch when fully secured to complement said bumper.

2. A bumper structure for motor vehicles, which includes: a bumper having two bores therethrough spaced from each other in the longitudinal direction of said bumper, strip means of yieldable resilient material shorter than but extending along said bumper and engaging the same at least over the major length thereof, connecting bolt means each having a head portion permanently connected to said strip means and extending through said bores, and means associated with said bolt means for securing said bolt means to said bumper, said bolt means when withdrawn from said bores being spaced from each other by a distance less than the spacing between said bores by a distance substantially equaling the extent to which said strip means must stretch when fully secured to complement said bumper, said bolt means comprising only two bolts respectively arranged at the end portions of said strip means, one of said bolts having a length equaling at least 1.5 times the difference between the spacing of said bores and the spacing between said bolts when first said strip means is unstressed, unstretched and detached from said bumper.

3. A bumper structure according to claim 2, in which each of said two bolts have flat areas extending along the length of said bolts and being arranged so that said flat areas of said two bolts face each other.

4. A bumper structure for motor vehicles, which includes: a bumper having two bores therethrough spaced from each other in the longitudinal direction of said bumper, strip means of yieldable resilient material shorter than but extending along said bumper and engaging the same at least over the major length thereof, connecting bolt means each having a head portion permanently connected to said strip means and extending through said bores, and means associated with said bolt means for securing said bolt means to said bumper, said bolt means when withdrawn from said bores being spaced from each other by a distance less than the spacing between said bores by a distance substantially equaling the extent to which said strip means must stretch when fully secured to complement said bumper, said bolt means comprising only two bolts respectively arranged at the end portions of said strip means, the total length of said two bolts equaling at least 1.5 times the difference between the spacing of said bumper bores and the shorter spacing between said bolts when said strip means is relaxed and detached from said bumper.

5. A bumper structure for motor vehicles, which includes: a bumper having two bores therethrough spaced from each other in the longitudinal direction of said bumper, strip means of yieldable resilient material shorter than but extending along said bumper and engaging the same at least over the major length thereof, connecting bolt means each having a head portion permanently connected to said strip means and extending through said bores, means associated with said bolt means for securing said bolt means to said bumper, said bolt means when withdrawn from said bores being spaced from each other by a distance less than the spacing between said bores by a distance substantially equaling the extent to which said strip means must stretch when fully secured to complement said bumper, and reinforcing insert means extending in the longitudinal direction of and embedded in said strip means and having said bolt means firmly connected thereto.

6. A bumper structure for motor vehicles, which includes: a bumper having two bores therethrough spaced from each other in the longitudinal direction of said bumper, strip means of yieldable resilient material shorter than but extending along said bumper and engaging the same at least over the major length thereof, connecting bolt means each having a head portion permanently connected to said strip means and extending through said bores, and means associated with said bolt means for securing said bolt means to said bumper, said bolt means when withdrawn from said bores being spaced from each other by a distance less than the spacing between said bores by a distance substantially equaling the extent to which said strip means must stretch when fully secured to complement said bumper, said bolts having saw-tooth-shaped locking portions, said saw-tooth-shaped portions of one bolt facing those of the other bolt.

7. A bumper structure according to claim 6, in which said bolts are of flat steel.

8. A bumper structure according to claim 6, in which said bolts are of round steel.

9. A bumper structure according to claim 6, which includes hollow cap means respectively and detachably slipped over said bolts and provided with an inwardly extending tooth-shaped portion for locking engagement with said saw-tooth-shaped locking portions.

* * * * *